United States Patent [19]
Zengel et al.

[11] 3,878,244
[45] Apr. 15, 1975

[54] PROCESS FOR THE PRODUCTION OF TEREPHTHALIC ACID DICHLORIDE

[75] Inventors: Hans Zengel, Kleinwallstadt; Dieter Frank, Elsenfeld; Manfred Bergfeld, Erlenbach, all of Germany

[73] Assignee: Akzo N.V., Arnhem, Netherlands

[22] Filed: Sept. 27, 1973

[21] Appl. No.: 401,536

[30] Foreign Application Priority Data
Sept. 29, 1972 Germany............................ 2247788

[52] U.S. Cl............................................ 260/544 M
[51] Int. Cl........................ C07c 51/50; C07c 63/30
[58] Field of Search................................ 260/544 D

[56] References Cited
FOREIGN PATENTS OR APPLICATIONS
7,116,151  5/1972  Netherlands.................... 260/544 D Primary Examiner—Lorraine A. Weinberger
Assistant Examiner—Richard D. Kelly
Attorney, Agent, or Firm—Johnston, Keil, Thompson & Shurtleff

[57] ABSTRACT

Process for preparing terephthalic acid dichloride in high yields by chlorination of a mixture of polyethylene terephthalate and terephthalic acid at elevated temperatures and preferably at elevated pressures in the presence of an inert organic solvent, especially chlorinated hydrocarbons and acid chlorides.

11 Claims, No Drawings

PROCESS FOR THE PRODUCTION OF TEREPHTHALIC ACID DICHLORIDE

A review of numerous possibilities for the synthesis of carboxylic acid chlorides will be found in Houben-Weyl, Methoden der organischen Chemie, Vol. XIII, Georg Thieme-Verlag, Stuttgart (1952), pages 463 ff. For example, terephthalic acid dichloride can be produced by the chlorination of terephthalic acid. As chlorinating agents, one can use phosphorous pentachloride as set forth in De la Rue, Liebigs Annalen der Chemie, Vol. 121, page 90, or a mixture of phosphorous pentachloride and phosphorous oxychloride as described in Lochner, Bulletin de la Societe Chim. de France (3) 11, 1927, or phosphorous oxychloride alone as in German Pat. No. 642,519.

Thionylchloride ($SOCl_2$) is also suitable as the chlorinating agent. According to the known processes, the reaction takes place in the presence of chlorides of metals of Groups III, IV and V of the periodic system of elements (German Pat. No. 701,953), in the presence of formic acid amides, e.g., dimethyl- or diethylformamide (German Pat. No. 1,026,750), in the presence of N,N-dimethyl-carbamic acid, N,N-dimethylacetamide, tetramethyldiaminosulfoxide, tetramethylurea, diethylamine or diphenylamine (USSR Pat. No. 223,087) or in the presence of pyridine (Reichel et al., C.A. Vol. 55, 1961, p. 4415). The presence of such substances as catalysts is considered to be necessary to successfully carry out the reaction.

Phosgene also comes into consideration as the chlorinating agent. The reaction is carried out in the presence of an equivalent of a tertiary base (British Pat. No. 401,643), under a phosgene pressure of 10 to 100 atmospheres and a reaction temperature of 100° to 150°C. (U.S. Pat. No. 2,657,233) or in the presence of dimethylformamide (Belgian Pat. No. 620,385) or in the presence of metals which form carbonyl or carbonyl halide or compounds of such metals, e.g., palladium, platinum, copper, nickel, cobalt and iron (British Pat. No. 987,516).

It is further known that terephthalic acid can be converted into the acid chloride by means of sulfur monochloride ($S_2Cl_2$) in the presence of a divalent or trivalent iron salt (Japanese Pat. No. 68 12123). One can also obtain terephthalic acid dichloride by reacting chlorine with terephthalic acid in the presence of iron, divalent or trivalent organic or inorganic iron salts and sulfur, the reaction being carried out in the presence or absence of solvents (Japanese Pat. No. 6920615).

Terephthalic acid dichloride is also obtained in the reaction of terephthalic acid with a halogenated hydrocarbon, e.g., carbon tetrachloride, in the presence of an iron catalyst such as anhydrous iron (III) chloride (Holland Patent Specification No. 6,604,995).

In place of terephthalic acid, it is also possible to subject p-toluene carboxylic acid to chlorination. According to the process described in U.S. Pat. No. 2,676,187, the chlorination is carried out in an inert solvent, e.g., in a chlorinated hydrocarbon, and in the absence of water with a 10 to 1,000 percent excess of chlorine. Instead of reacting pure p-toluene carboxylic acid, there can be used a reaction mixture obtained by the partial oxidation of p-xylene (U.S. Pat. No. 2,791,608) or the methyl ester of the carboxylic acid (USSR Pat. No. 176,884).

In another series of known processes, one can proceed from 1,4-bis-(trichloromethyl)-benzene as obtained by chlorination of xylene or from 3-trichloromethyl-benzoylchloride as obtained by partial hydrolysis of the 1,4-bis-(trichloromethyl-benzene. According to the process of German Pat. No. 708,149, these compounds are converted into terephthaloyl chloride by boiling with water in the presence of a catalyst. The 1,4-bis-(trichloromethyl)-benzene also reacts to form terephthalic acid dichloride by treatment with the oxide of one of the metals titanium, vanadium, arsenic, zirconium, antimony, germanium, tin or niobium (U.S. Pat. No. 2,856,425) or by treatment with sulfur dioxide in the presence of iron chloride or iron bromide (U.S. Pat. No. 3,411,886).

It is still further known from U.S. Pat. Nos. 2,525,722 and 2,625,523 that p-trichloromethyl-benzoylchloride is converted into terephthalic acid dichloride by means of an anhydride-forming dicarboxylic acid, especially with maleic acid. According to the process described in British Pat. No. 909,086, the mono-, di- and trichloroacetic acids are used for the halogenation interchange.

Terephthalic acid dichloride can also be produced by reaction of benzotrichloride or benzoylchloride with terephthalic acid (German Pat. No. 680,182 and U.S. Pat. No. 1,963,748). This reaction results in a mixture of acid chlorides. By comparison, if one proceeds from p-bis-(trichloromethyl)-benzene and terephthalic acid, no second acid chlorides are obtained as by-products but instead only the desired terephthalic acid dichloride is obtained in good yields (French Pat. No. 820,698). This reaction can be carried out by reacting a mixture of the terephthalic acid and p-bis-(trichloromethyl)-benzene heated to about 100°–130°C. either continuously at a temperature of about 270°–330°C. or by introduction into a melt of terephthalic acid (German Pat. No. 1,196,636). A higher yield of terephthalic acid dichloride can be achieved by following the procedure disclosed in British Pat. No. 949,574.

A further possibility for the synthesis of terephthalic acid dichloride exists in the chlorination of esters of terephthalic acid. These may be aliphatic esters such as the dimethyl ester (German Pat. No. 1,064,495) or alkylaromatic esters such as the benzyl ester (German Pat. No. 1,070,616). Compare also the disclosure of U.S. Pat. No. 2,865,959. Especially so as to avoid troublesome sublimation at the beginning or end of the reaction, it is recommended in German Pat. No. 1,152,400 for the use of the terephthalic acid dimethyl ester to further add to the reaction mixture 2 to 10 percent by weight of a liquid chloride or methyl ester of an aromatic carboxylic acid such as benzoylchloride or benzoic acid methyl ester.

In addition, terephthalic acid dichloride can be produced by chlorination of terephthalidialdehyde (benzene-p-dialdehyde) in the vapor phase at temperatures of 300°–500°C. and in the presence of an inert gas, wherein there is employed 5 to 30 mols of inert gas and 2 to 10 mols of chlorine per mol of the terephthaldialdehyde (see U.S. Pat. No. 3,274,242).

It is further known from the Holland Patent Specification No. 7,116,151 that one can produce dicarboxylic acid chlorides from polyesters for which the dicarboxylic acid dichlorides are the basis of the polymer units. According to this known process, the polyester is chlorinated in a reaction medium which is liquid under the reaction conditions and at temperatures of 70°–400°C. under normal or elevated pressures. As the reaction medium, there may be used aliphatic or aromatic hydrocarbons or inert organic acid chlorides.

The object of the present invention is to provide a process of producing terephthalic acid dichloride in good yields in a single reaction under relatively moderate and economical conditions from a readily available combination of starting materials. More particularly, it is an object of the invention to provide a very useful and valuable commercial process to convert a mixture of terephthalic acid and polyethylene terephthalate into the desired terephthalic acid dichloride.

It has been found, in accordance with the invention, that it is possible to produce terephthalic acid dichloride from a mixture of polyethylene terephthalate and terephthalic acid with a content of up to one mol of the terephthalic acid per mol of ethylene-terephthaloyl units of the polyethylene terephthalate by reacting this mixture with chlorine gas at a temperature of about 150°C. to 350°C., preferably about 180°C. to 250°C., and also preferably under an elevated pressure of up to about 120 atmospheres gauge in the presence or absence of an inert organic solvent, the molar ratio of the chlorine to the sum of the terephthalic acid and ethylene-terephthaloyl units lying in a range of 3:1 to 10:1.

In the chlorination of polyethylene terephthalate with chlorine gas, phosgene and hydrogen chloride are obtained as by-products in addition to the desired terephthalic acid dichloride. This reaction can be illustrated by the following equation of a single recurring ethylene-terephthaloyl unit:

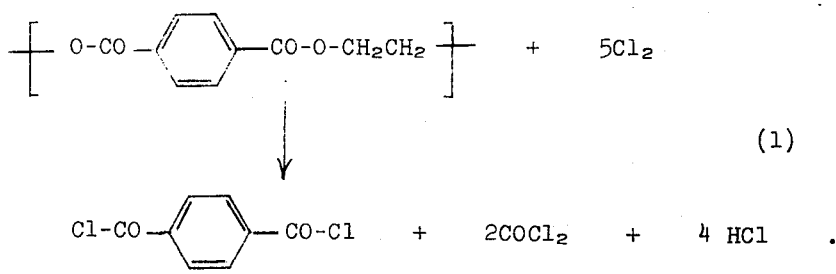

(1)

The chlorination is believed to take place according to the following equation, i.e., primarily through formation of the oxalic acid dichloride:

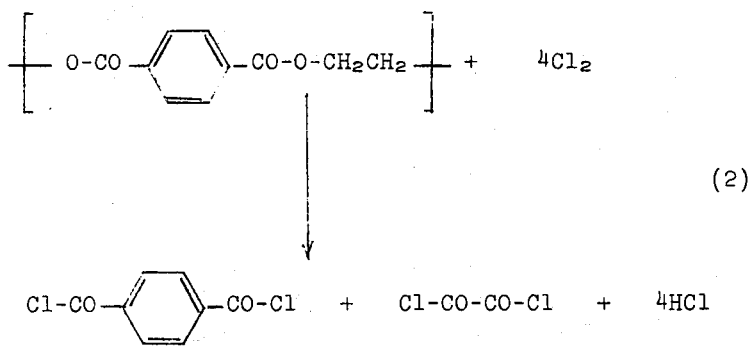

(2)

which may then be further converted into phosgene by the parallel reaction:

$$Cl-CO-CO-Cl + Cl_2 \rightarrow 2COCl_2$$

(3)

Surprisingly, it has been discovered that the phosgene arising in the chlorination of polyethylene terephthalate can be used directly under the same reaction conditions to produce additional terephthalic acid dichloride by the additional reaction of up to one mol of terephthalic acid per mol of the polyethylene terephthalate polymer, i.e., with reference to the mols of ethylene-terephthaloyl units in this polymer. Thus the phosgene obtained as a by-product in the reaction of equation (1) reacts further with the terephthalic acid to form terephthalic acid dichloride, hydrogen chloride and carbon dioxide as follows:

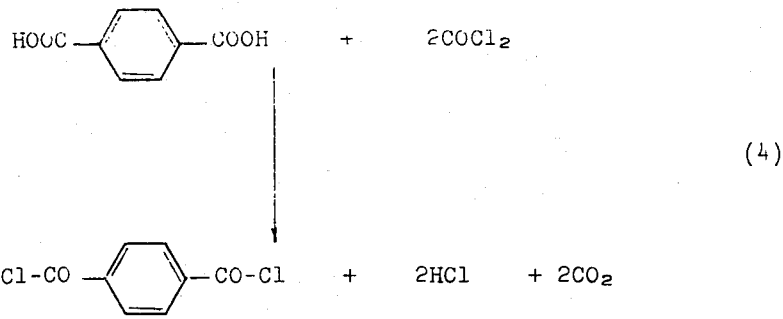

(4)

This not only permits two very different initial materials to be used in the same process but also provides a better utilization of the chlorine gas and avoids formation of phosgene as a by-product.

The polyethylene terephthalate used as one initial reactant in the process of the present invention is preferably the relatively pure homopolymer which is a well-known fiber-forming linear polyester based upon terephthalic acid and ethylene glycol as the basic monomers. Actually, polyethylene terephthalate is usually prepared by transesterification of the dimethyl ester of terephthalic acid with ethylene glycol followed by polycondensation into the linear polyester. The term "polyethylene terephthalate" is also used herein to also include closely related and substantially equivalent copolymers with a content of up to 20 mol percent of other phenyl radicals or dicarboxylic monomers as well as other glycol components. Likewise, small amounts of terminal monohydroxy alcohols and/or monocarboxylic acids may also be present. Such polyethylene terephthalate products as polyesters are as produced in a known manner, for example by the reaction of terephthalic acid with up to 20 mol percent of one or more other dicarboxylic acids, e.g., such as isophthalic acid, or the lower alkyl esters of such acids, with ethylene glycol and suitably one or more difunctional or polyfunctional aliphatic, alicyclic, aromatic or araliphatic alcohols or even bisphenols. Typically suitable diols and phenols are as follows: ethylene glycol; diethylene glycol; 1,3-propanediol; 1,5-butanediol; 1,6-hexanediol; 1,8-octanediol; 1,10-decanediol; 1,2-propanediol; 2,2-dimethyl-1,3-propanediol; 2,2,4-trimethylhexanediol; p-xylylenediol; 1,4-cyclohexanediol; 1,3-cyclohexanediol; 1,4-cyclohexane-dimethanol; and Bisphenol A.

All copolyesters with such minor amounts of monomers other than terephthalic acid and ethylene glycol are useful for purposes of the present invention because the copolyester reactant as a modified polyethylene terephthalate still contains the recurring ethylene-terephthaloyl units of the formula

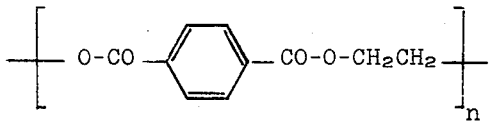

wherein $n$ is a whole integer. The number of mols of the polyester is based upon this recurring ethylene-terephthaloyl throughout the present specification and the accompanying claims.

The polyesters required as one reactant according to the invention may be of either high or low molecular weight, i.e., where there are only a few ethylene-terephthaloyl units in the linear polymer chain or where there is a very high number of such units as in typical fiber-forming and film-forming polyethylene terephthalate polymers. Such polyesters are employed in very large amounts for the production of fibers, filaments, yarns, etc. in the synthetic textile industry. Both in the commercial production and melt-spinning of these polyesters and also in their chemical and mechanical processing, relatively large amounts of a fibrous waste accrues, i.e. a polyester scrap or discard material which often cannot be easily reprocessed into fibers. This waste material has proven to be of particular value, whether as the pure polyester or as the above-noted copolyesters, for use as one initial reactant in the production of terephthalic acid dichloride in accordance with the process of the present invention.

The polymer reactant can be introduced into the reaction as a granulate or in the form of cuttings but especially as the polyester fibrous waste, i.e. as obtained in the form of staple fibers, filamentary yarns, rovings, fleeces and the like. It is obviously helpful to have a large unit area of exposed fibrous surface per unit weight of the polymer. In most cases it is not necessary to separate finishing agents such as lubricants or other auxiliaries from the fibrous material. Likewise, dyes, pigments, fillers, conventional transesterification and polycondensation catalysts, antistatic agents, stabilizing agents, and similar additives incorporated into the polyester material do not influence the chlorination reaction or at least do not have any significant effect on the reaction.

The terephthalic acid is a readily available initial reactant and may also be used in either pure form or as a relatively crude material, preferably containing not more than about 5 percent of impurities. In order to achieve the most effective results, it is desirable to use terephthalic acid as the co-reactant with polyethylene terephthalate in an amount up to as close as possible to about one mol per mol of ethylene-terephthaloyl units. In general, one should employ a molar ratio of terephthalic acid: ethylene-terephthaloyl units of about 0.8:1 to 1:1. However, it is feasible to use much smaller amounts of terephthalic acid with a still very effective conversion with terephthalic acid dichloride even though the process then requires greater care in disposing of by-products such as phosgene. Thus, the molar ratio of terephthalic acid:ethylene-terephthaloyl units may extend from at least about 0.1:1 up to 1:1 and preferably from about 0.5:1 to 1:1. An excess of terephthalic acid above the stoichiometric upper limit is uneconomical and relatively undesirable.

The process of the invention is carried out at temperatures of about 150°C. to 350°C. Below 150°C. the reaction speed becomes too slight and the selectivity tends to fall sharply. In this temperature range, a nuclear chlorination already begins to take place so that noticeable amounts of mono-, di-, tri- and perchloroterephthalic acid dichlorides are obtained as by-products. With increasing temperatures, the yield of the desired product is greater, an optimum yield being achieved at about 250°C. after which the yield again declines, probably due to cracking reactions.

A number of procedures can be followed in carrying out the process of the invention. The chlorination is preferably carried out in the presence of an inert organic solvent at an elevated temperature, e.g. up to about 120 atmospheres gauge, and at temperatures in the range of 150°–300°C., especially 180°–250°C. As the inert solvent, chlorinated hydrocarbons or inert carboxylic acid chlorides are especially suitable. Particularly useful solvents are carbon tetrachloride, tetrachloroethylene, chlorobenzene, o-dichlorobenzene and terephthalic acid dichloride or mixtures of such solvents.

The proportion of the solvent at the beginning of the reaction is preferably sufficient to completely wet or cover the polyethylene terephthalate reactant in admixture with terephthalic acid. For example, one can generally use the solvent in an amount of up to about 100 percent by weight, preferably about 70 to 95 percent by weight, taken with reference to the amount of terephthalic acid dichloride to be produced in the reaction.

In addition to the temperature, it has been noted that the reaction time and the proportion of chlorine to the ethylene-terephthaloyl units also exert a noticeable infuence on the chlorination in the process of the invention with respect to both yield and selectivity. According to the reaction equation, the stoichiometric proportion of reactants is 2 mols of "terephthalate units" (i.e. 1 mol of the ethylene-terephthaloyl polymer units + 1 mol terephthalic acid) to 5 mols of chlorine. With an amount of chlorine which is less than the stoichiometric proportion, e.g. down to 3 mols of chlorine per 2 mols of "terephthalate units," one can still achieve outstanding yields of terephthalic acid dichloride. For example, the yields in the process of the invention lie over 80 percent of theory. With even smaller proportions of chlorine, undesirable by-products tend to form in increasing amounts. Also, the yield of terephthalic acid dichloride drops sharply if the proportion of chlorine to the terephthalate units is less than 3:2. In this same range of proportions represented by too small an amount of chlorine, the selectivity falls off along with the yield and there are obtained both chlorinated oligomers and terephthalic acid bis-(2-chloroethylester) as by-products.

Optimum yields are achieved as a rule when using approximately a 10 molar percent excess of chlorine over the stoichiometric amount. As a practical upper limit, one may use chlorine in a molar proportion with reference to the terephthalate units of about 10:2.

The reaction temperature should remain in the prescribed range of about 150°C. to 300°C. with optimum results being obtained at temperatures of about 180°–250°C. In general, the pressure is that which results at the reaction temperature in a closed vessel, and naturally depends upon the particular solvent or solvent mixture being used. As a rule, preferred pressures are in a range of about 30 to 80 atmospheres gauge.

The chlorination proceeds unusually rapidly under the given reaction conditions. Nearly quantitative results according to the reaction equations are usually obtained in about 20 to 120 minutes. Longer periods of reaction should ordinarily be avoided on account of the danger of by-product formation.

The terephthalic acid dichloride is known to be a valuable commercial product, e.g. as used in large amounts for producing aromatic polyamides, polyhydrazides, polyacyloxalamidrazones and many other special polymers having valuable properties.

It was quite surprising to learn, in accordance with this invention, that by chlorinating polyethylene terephthalate one could simultaneously convert terephthalic acid into terephthalic acid dichloride. In the previously known processes for the production of terephthalic acid dichloride from terephthalic acid and phosgene, it is necessary to use high phosgene pressures, very large amounts of hydrogen chloride acceptors and also catalysts in most circumstances. For a skilled chemist, such conditions are not compatible with those known to be required for an effective chlorination of polyethylene terephthalate.

By comparison, the process according to the present invention succeeds very well even with large amounts of terephthalic acid, i.e. even though phosgene is not present in excess but is provided only to the extent that it is available as a by-product in the chlorination of polyethylene terephthalate. Moreover, basic compounds as hydrogen chloride acceptors are not necessary, and the reaction according to the invention proceeds very well without any catalyst.

With the present invention, one achieves an important commercial advantage in a very economical process for the production of terephthalic acid dichloride. It becomes possible not only to reuse polyethylene terephthalate waste materials in a known manner, but beyond this it is also possible to convert terephthalic acid into terephthalic acid dichloride at no additional cost. Moreover, phosgene can be practically eliminated as a by-product in the treatment of the polyester. Even with relatively small added amounts of terephthalic acid in the initial reaction mixture, one can achieve a better result as by dispensing with catalysts, acceptors and the like which complicate the recovery of the desired product as well as being more expensive. The process of the invention is also advantageous because it lends itself to a continuous process as well as the more conventional batch process.

The process according to the invention is further exemplified as follows:

EXAMPLE 1

5 grams of polyethylene terephthalate (corresponding to 0.026 mols of the recurring ethyleneterephthaloyl units of the polymer) were suspended with 2.16 grams (0.013 mols) of terephthalic acid and 40 ml. of carbon tetrachloride in a 100 ml.-capacity V4A-autoclave, i.e. an autoclave lined with a V4A-steel alloy. This suspension was mixed with 18.5 grams (0.26 mols) of chlorine gas, the reaction mixture then heated to 250°C. and maintained at this temperature for about 2 hours. The pressure rose during the course of the reaction to about 80 atmospheres guage. After cooling and then relesing the autoclave to atmospheric pressure, the resulting light brown-colored reaction mixture was filtered. From the filter residue there was recovered 0.5 grams of unreacted terephthalic acid. The filtrate was freed of the carbon tetrachloride solvent to yield 7.9 grams of a crude terephthalic acid dichloride which proved to be 92.4 percent after saponification with an aqueous sodium hydroxide solution. The yield was calculated to be 92.2 percent of theory, taken with reference to the polyethylene terephthalate and terephthalic acid reactants.

Further examples carried out in substantially the same manner as in the foregoing example are given in the table which follows:

Key: TA = Terephthalic acid
PET = Polyethylene terephthalate

| Ex. No. | Molar Ratio TA : PET | Solvent | Molar Ratio $Cl_2$:(TA+PET) | Temp. °C. | Max. Pressure Atm. gauge | Reaction time-Min. | Yield % Theory |
|---|---|---|---|---|---|---|---|
| 2 | 1 : 2.2 | carbon tetrachloride | 6.4 : 1 | 250 | 80 | 60 | 77.0 |
| 3 | 1 : 2 | terephthalic acid dichloride | 7.0 : 1 | 240 | 75 | 120 | 90.0 |
| 4 | 1 : 1 | carbon tetrachloride | 7 : 1 | 250 | 80 | 120 | 91.1 |
| 5 | 1 : 3 | chlorobenzene | 5.5 : 1 | 250 | 80 | 120 | 98.0 |

The invention is hereby claimed as follows:

1. A process for the production of terephthalic acid dichloride which comprises reacting a mixture of polyethylene terephthalate and terephthalic acid with chlorine gas at a temperature of about 150°C. to 350°C., said mixture containing about 0.1 mol up to about one mol of terephthalic acid per mol of the recurring ethylene-terephthaloyl unit of the polyethylene terephthalate and the molar ratio of said chlorine to the sum of said terephthalic acid and said ethylene-terephthaloyl units being in the range of 3:1 to 10:1.

2. A process as claimed in claim 1 wherein said reaction is carried out in the presence of an inert organic solvent.

3. A process as claimed in claim 2 wherein said inert organic solvent is at least one substance selected from the class consisting of chlorinated hydrocarbons and carboxylic acid chlorides.

4. A process as claimed in claim 2 wherein said inert organic solvent is selected from the class consisting of carbon tetrachloride, tetrachloroethylene, chlorobenzene, o-dichlorobenzene, terephthalic acid dichloride and mixtures thereof.

5. A process as claimed in claim 1 wherein said reaction is carried out at an elevated pressure of up to about 120 atmospheres gauge.

6. A process as claimed in claim 1 wherein said reaction is carried out at a temperature of about 180°C. to 250°C. and a gauge pressure of about 30 to 80 atmospheres.

7. A process as claimed in claim 6 wherein said reaction is carried out in the presence of an inert organic solvent.

8. A process as claimed in claim 7 wherein said inert organic solvent is at least one substance selected from the class consisting of chlorinated hydrocarbons and carboxylic acid chlorides.

9. A process as claimed in claim 7 wherein said inert organic solvent is selected from the class consisting of carbon tetrachloride, tetrachloroethylene, chlorobenzene, o-dichlorobenzene, terephthalic acid dichloride and mixtures thereof.

10. A process as claimed in claim 1 wherein said reaction is carried out at said temperature and at an elevated pressure for a period of time sufficient to obtain at least a 90 percent molar conversion of said mixture into terephthalic acid dichloride.

11. A process as claimed in claim 1 wherein the molar ratio of terephthalic acid to the recurring ethylene-terephthaloyl unit is 0.5:1 to 1:1.

* * * * *